(No Model.)
I. L. SHELDON.
CYCLOMETER.
No. 515,257.    Patented Feb. 20, 1894.
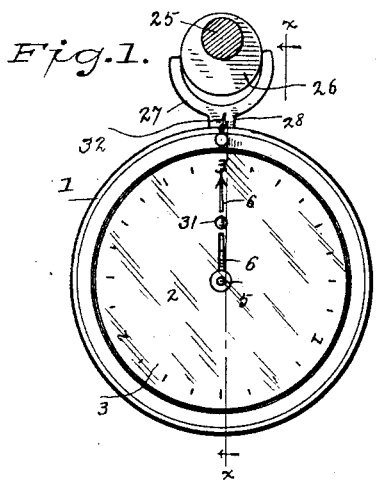
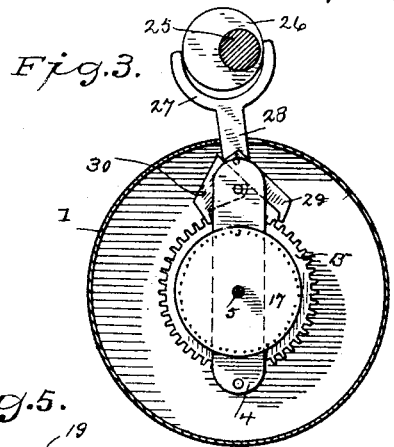
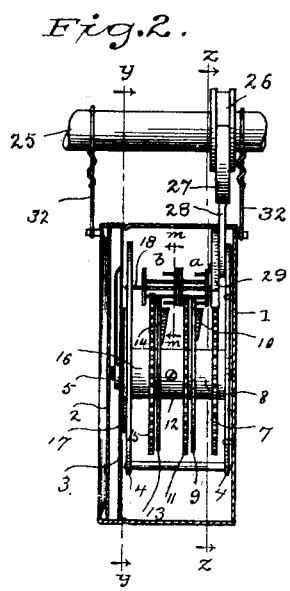
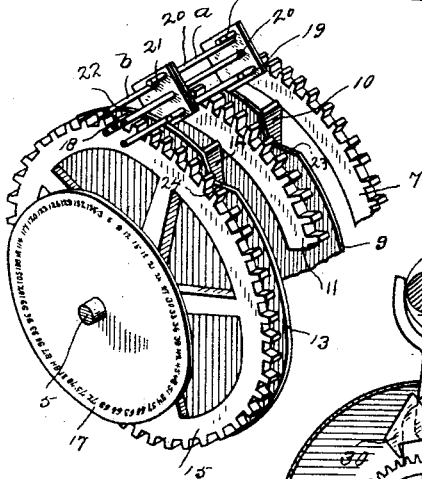
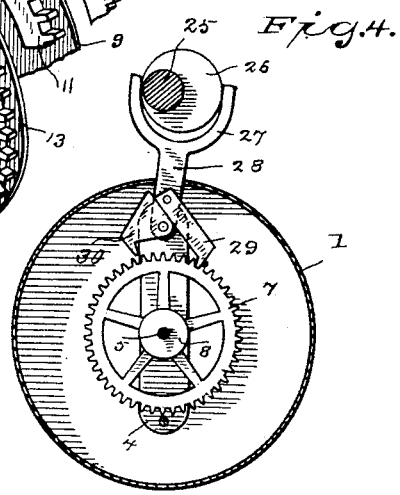
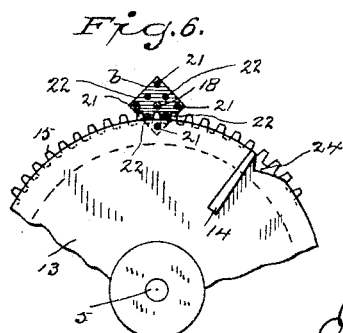
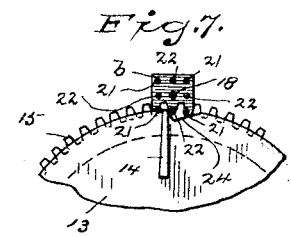
WITNESSES
H. H. Lantz
Pearl Reynolds
INVENTOR
Irving L. Sheldon
By A. M. Wooster
Atty.
THE NATIONAL LITHOGRAPHING COMPANY,
WASHINGTON, D. C.

UNITED STATES PATENT OFFICE.

IRVING L. SHELDON, OF DANBURY, CONNECTICUT.

CYCLOMETER.

SPECIFICATION forming part of Letters Patent No. 515,257, dated February 20, 1894.

Application filed August 31, 1893. Serial No. 484,452. (No model.)

*To all whom it may concern:*

Be it known that I, IRVING L. SHELDON, a citizen of the United States, residing at Danbury, in the county of Fairfield and State of Connecticut, have invented certain new and useful Improvements in Cyclometers; and I do hereby declare the following to be a full, clear, and exact description of the invention, such as will enable others skilled in the art to which it appertains to make and use the same.

My invention has for its object to produce a simple, durable and inexpensive cyclometer or distance recorder for cycles, my improved cyclometer being equally accurate with other cyclometers and capable of being produced at a mere fraction of the expense of the various cyclometers now upon the market.

With these ends in view I have devised the novel instrument which I will now describe referring by numbers and letters to the accompanying drawings forming part of this specification, in which—

Figure 1 is an elevation of the instrument as in use the shaft of the driving wheel being in section; Fig. 2 a section on the line $x\ x$ in Fig. 1; Fig. 3 a section on the line $y\ y$ in Fig. 2 showing the position of the pawls at the instant an actuation of the first wheel is about to commence; Fig. 4 a section on the line $z\ z$ in Fig. 2 showing the position of the pawls at the end of an actuation of the first wheel, but before the wheel is locked; Fig. 5 an enlarged perspective of the three wheels and the pinions; Fig. 6 a section on the line $m\ m$ in Fig. 2 looking toward the left showing the position of the parts while the third wheel is locked, and Fig. 7 is a similar view showing the position of the parts at the instant the third wheel is moving one tooth.

1 denotes the case having in its front a glass 2 and back of the glass a stationary dial 3.

4 denotes the side plates which are suitably secured in the case and 5 the shaft journaled therein. This shaft carries at its outer end a pointer 6 which is adapted to move over the face of the stationary dial.

7 denotes the first wheel, the hub 8 of which is journaled on the shaft and carries a disk 9 having a lug 10 and a recess 23 in its periphery.

11 denotes the second wheel, the hub 12 of which is rigidly secured to the shaft, said hub carrying a disk 13 having a lug 14 and a recess 24 in its periphery.

15 denotes the third wheel, the hub 16 of which is adapted to turn independently of the shaft, or rather the shaft turns within the hub. This hub carries a dial 17 which is adapted in the present instance to record miles traveled in groups of three miles, as will presently be more fully explained.

18 denotes a rod journaled in the side plates upon which a first pinion "$a$" and a second pinion "$b$" are journaled. Pinion "$a$" is provided with short pins 19 and with long pins 20 and pinion "$b$" is provided with short pins 21 and with long pins 22 the purposes of which will presently be explained.

25 denotes the shaft of the driving wheel of a cycle from which the mechanism of the cyclometer is actuated in any suitable manner, in the present instance by an eccentric 26 which is embraced by a yoke 27 on an arm 28 which is pivoted to one of the side plates. This arm carries a driving pawl 29 which engages the teeth of the first wheel to drive it forward, and a locking pawl 30 which engages the teeth of the first wheel just before they are released by the driving pawl and acts to lock it against backward movement, said driving pawl and said locking pawl being so constructed and pivoted to the arm relatively to each other that the locking pawl will release the first wheel just at the instant that it is engaged by the driving pawl to move it forward.

The operation is as follows:—Each rotation of the driving shaft acts through the eccentric, yoke and pawls to carry the first wheel forward one tooth. In the present instance the three wheels each have forty-five teeth so that forty-five revolutions of the driving shaft will impart one revolution to the first wheel. The normal position of the second and third wheels is clearly indicated in Fig. 6 although the special wheel shown in said view is the third wheel. The principle of locking the second and third wheels is identical. The long pins of the first pinion, see Fig. 5 engage the second wheel to lock it against movement in either direction until it is released. Once during each revolution of the first wheel lug 10 on disk 9 which moves with the first wheel, engages one of the short pins of the first pinion and imparts to said first pinion a quarter revolution, one of the long pins, passing down into recess 23 in disk 9 so as to permit the pinion to turn. This movement will be clearly understood from Figs. 6 and 7 the movement of the second and third wheels being identical, as already stated. Fig. 6 shows the position of the pinion and wheel before the lug has engaged the short pin. Fig. 7 shows the position of the parts during the movement of the pinion and before the lug has quite passed beyond the short pin. The purpose of recess 23 will be understood from this figure, it being necessary to permit one of the long pins to move downward slightly when the movement of the pinion takes place. This movement of the first pinion carries the second wheel forward one tooth. After this movement the second wheel will be locked again by the pinion as before, the position of the wheel and pinion after the forward movement of the wheel and pinion being the same as that in Fig. 6. Forty-five revolutions of the first wheel will in the manner just described produce one complete revolution of the second wheel. As the mode of operating the third wheel is precisely the same as that of operating the second wheel, it follows that forty-five revolutions of the second wheel will produce one revolution of the third wheel. In the present instance I have shown the stationary dial as graduated to three miles, the pointer being carried by the shaft which moves with the second wheel. The stationary dial is provided with an opening 31 in its face through which the numbers upon dial 17 show. Each revolution of the shaft and pointer will indicate three miles upon dial 3 and will cause a new number on dial 17 to appear at the opening in dial 3, dial 17 as already stated being graduated to indicate three miles at each movement. It will of course be understood that the special graduation of the dials and the number of teeth in the wheels is not of the essence of my invention. I have arbitrarily selected a certain size of wheel and certain graduations merely to illustrate the principle of my invention.

The instrument is held in place upon a cycle in any suitable manner, as by wires 32 which pass around the shaft of the cycle and are connected to the case.

Having thus described my invention, I claim—

1. A cyclometer consisting of a stationary dial, a shaft carrying a pointer moving over the face of the dial, a first wheel loose on the shaft, a lug 10, a second wheel fixed to the shaft, a lug 14, a third wheel loose on the shaft, a pinion "$a$" having short pins adapted to be engaged by lug 10, and long pins adapted to normally lock the second wheel and to carry said second wheel forward when said pinion is rotated, and a pinion "$b$" having short pins adapted to be engaged by lug 14 and long pins adapted to normally lock the third wheel and to carry said third wheel forward when said pinion is rotated, and suitable actuating mechanism for the first wheel adapted to be driven from the cycle to which the instrument is applied.

2. A cyclometer consisting of a stationary dial, a shaft carrying a pointer moving over the face of the dial, a first wheel loose on the shaft, a disk 9 moving with the first wheel and having a lug 10, a second wheel fixed to the shaft, a disk 13 fixed to the shaft and having a lug 14, a third wheel loose on the shaft and carrying a dial 17, a pinion "$a$" having short pins adapted to be engaged by lug 10, and long pins adapted to normally lock the second wheel and to carry said second wheel forward when said pinion is rotated, and a pinion "$b$" having short pins adapted to be engaged by lug 14 and long pins adapted to normally lock the third wheel and to carry said third wheel forward when said pinion is rotated, and suitable actuating mechanism for the first wheel adapted to be driven from the cycle to which the instrument is applied.

3. A cyclometer consisting of a stationary dial having an opening 31, a shaft carrying a pointer moving over the face of the dial, a first wheel loose on the dial, a disk 9 moving with the first wheel and having a lug 10, a second wheel fixed to the shaft, a disk 13 fixed to the shaft and having a lug 14, a third wheel loose on the shaft and carrying a dial 17 whose graduations are adapted to show through opening 31, a pinion "$a$" having short pins adapted to be engaged by lug 10 and long pins adapted to normally lock the second wheel and to carry said second wheel forward when said pinion is rotated, and a pinion "$b$" having short pins adapted to be engaged by lug 14 and long pins adapted to normally lock the third wheel and to carry said third wheel forward when said pinion is rotated, and suitable actuating mechanism for the first wheel.

In testimony whereof I affix my signature in presence of two witnesses.

IRVING L. SHELDON.

Witnesses:
C. F. HADDEN,
S. MELDIN.